March 15, 1949. T. W. KENYON 2,464,516
ERECTING MECHANISM FOR GYRO-VERTICALS AND THE LIKE
Filed May 9, 1947 4 Sheets-Sheet 1

INVENTOR.
THEODORE W. KENYON
BY
Kenyon & Kenyon
ATTORNEYS

March 15, 1949.    T. W. KENYON    2,464,516
ERECTING MECHANISM FOR GYRO-VERTICALS AND THE LIKE
Filed May 9, 1947    4 Sheets-Sheet 2

INVENTOR.
THEODORE W. KENYON
BY
Kenyon & Kenyon
ATTORNEYS

March 15, 1949.  T. W. KENYON  2,464,516
ERECTING MECHANISM FOR GYRO-VERTICALS AND THE LIKE
Filed May 9, 1947  4 Sheets-Sheet 3
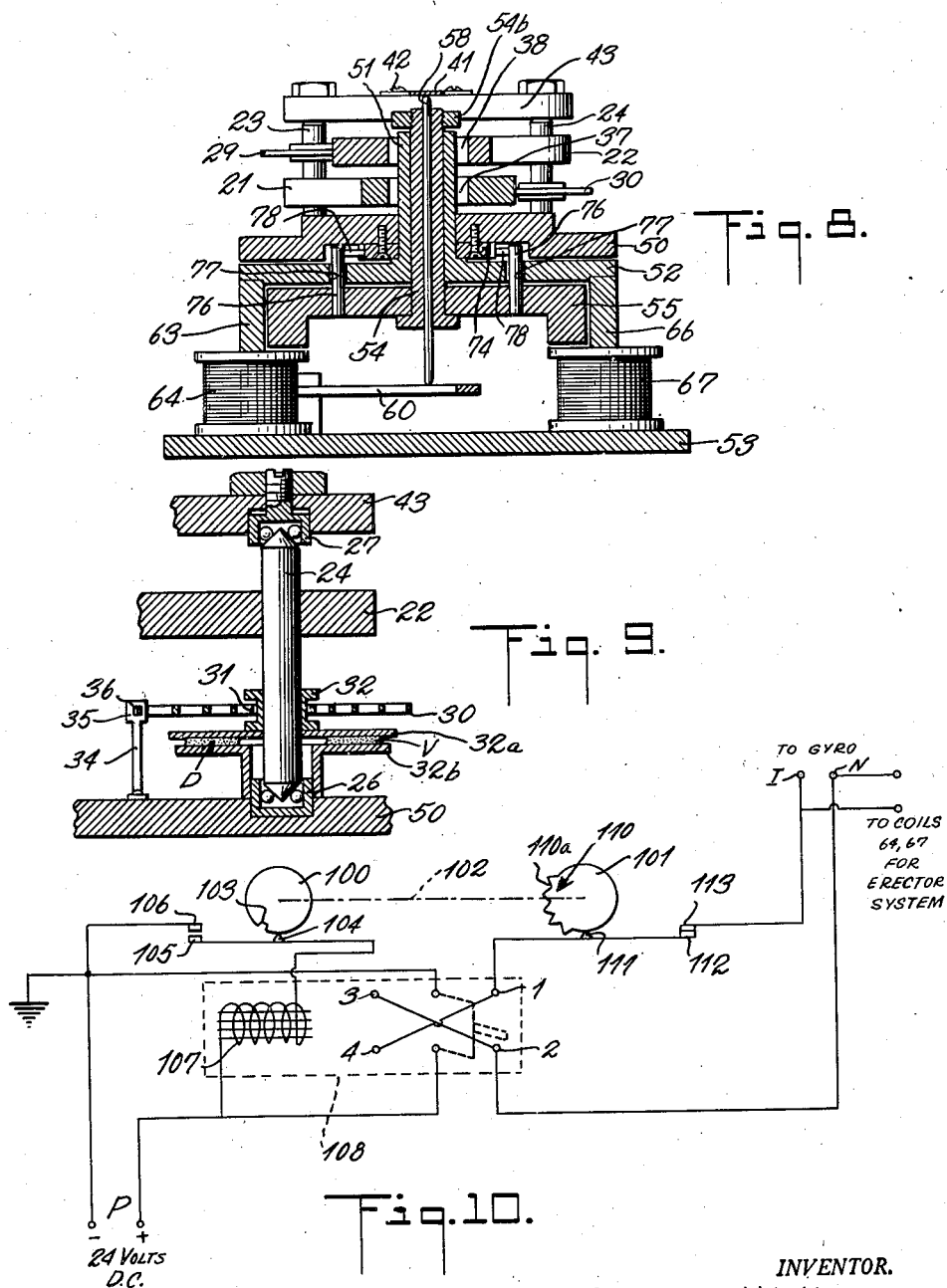
INVENTOR.
THEODORE W. KENYON
BY
Kenyon & Kenyon
ATTORNEYS

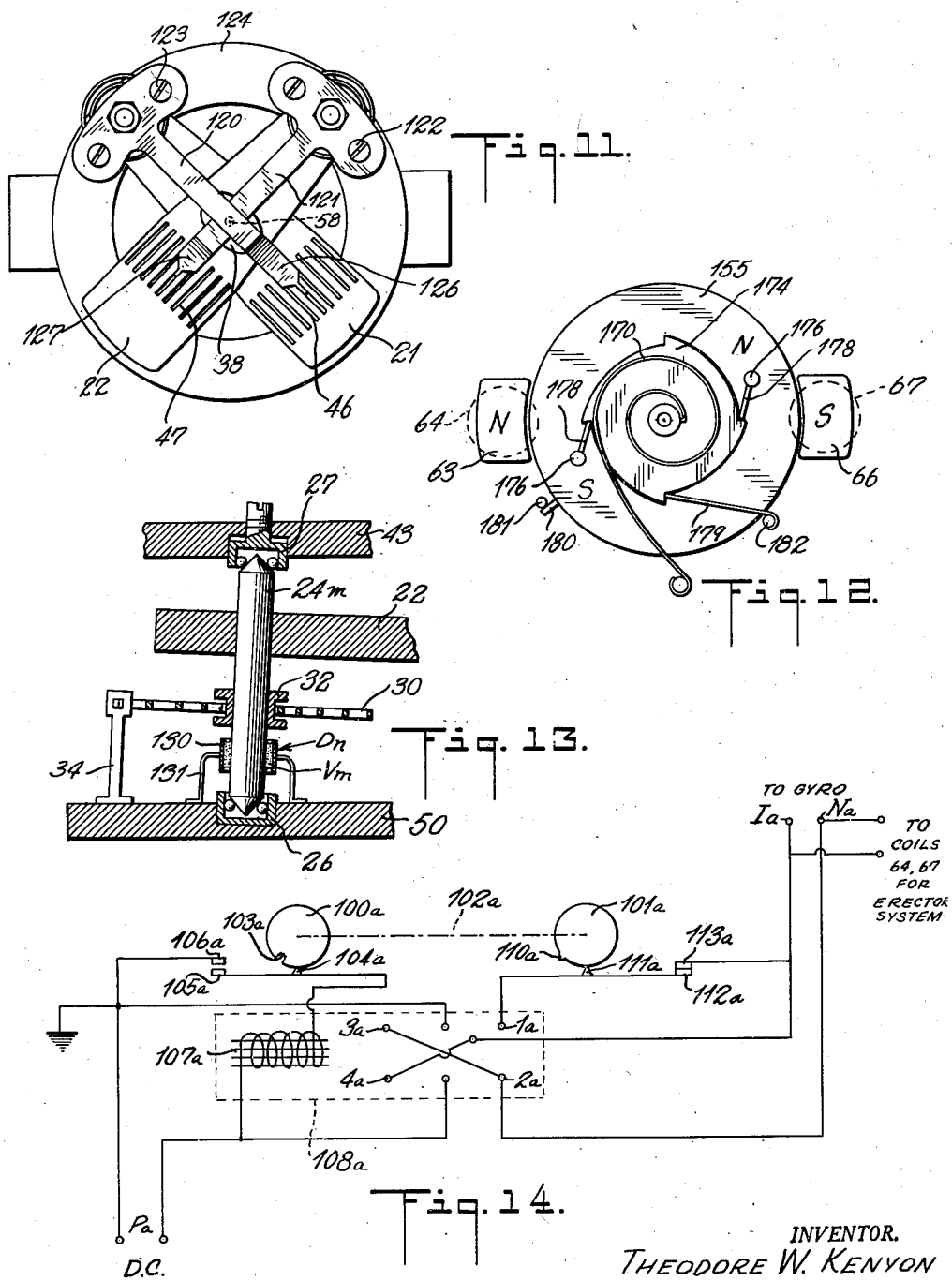

Patented Mar. 15, 1949

2,464,516

UNITED STATES PATENT OFFICE 2,464,516

ERECTING MECHANISM FOR GYRO-VERTICALS AND THE LIKE

Theodore W. Kenyon, Huntington, N. Y., assignor to Kenyon Gyro & Electronics Corporation, Huntington, N. Y., a corporation of New York Application May 9, 1947, Serial No. 746,995

14 Claims. (Cl. 74—5.44)

1

This invention relates to gyro-verticals, and more particularly to a novel erecting mechanism for use in conjunction therewith.

An object of the invention is to provide novel erector mechanism useful particularly with an electrically driven gyroscope. In cases, for example, where the gyro and erector mechanism are driven by direct current, the erector mechanism may be controlled by using only the lead-in connections that are necessary to drive the gyro-motor, in other words the electrically controlled erector mechanism is operable simultaneously from the same electrical source driving the gyro. Cases where the gyro and the erector mechanism are operated by different sources of electric current, for example, the gyro by alternating current and the erector mechanism by direct current are, however, also contemplated as within the scope of this invention.

Another object of the invention is to provide a simple and effective erector mechanism which will provide a slower erection rate for the gyro when it is to be returned to its vertical position from a slightly off vertical position than when the gyro is considerably off vertical. Such provision is a distinct advantage because then the gyro will not be deflected violently in restoration from slightly off vertical deviations to its vertical position, but if for some reason the gyro becomes considerably upset, will provide a faster rate of erection to take place in the restoration to vertical. By the arrangements to be described, however, full erector force can be applied to the gyro unit until it reaches any desired accuracy of erection. Thus, the gimbal bearing friction becomes less important and the gyro will erect accurately even though a large amount of bearing friction exists. In fact, it will be possible to effect accurate erection with larger amounts of bearing friction present than is possible with other erector systems presently known to me.

Another object of the invention is to embody novel damping means in the erector system in such manner that the erector mechanism will not be affected by transient accelerations.

Another object of the invention is to provide means to facilitate control of the erecting action, for example, to enable the operator to stop erection at will. In the present invention, the erector mechanism includes one or more unbalanced weights. In the control of erection the operator is able to prevent release of the erector weights for any desired period of time such as during a turn. In this way with the mechanism of this invention the "turn error" may be com-

2 pletely eliminated. There may be other types of errors or there may be other reasons for control of the erector action and these may be accomplished in the use of mechanism embodying this invention.

Another object of the invention is to provide erector mechanism that can be applied to existing gyroscopes without material modification.

To the accomplishment of the foregoing and such other objects as may hereinafter appear, the invention comprises the novel construction and arrangement of parts hereinafter to be described and then sought to be defined in the appended claims, reference being had to the accompanying drawings forming a part hereof, which show merely for the purposes of illustrative disclosure, preferred embodiments of the invention, it being expressly understood, however, that changes may be made in practice within the scope of the claims without digressing from the inventive idea.

In the drawings in which similar reference characters denote corresponding parts:

Fig. 8 is a transverse section taken along line 8—8 of Fig. 3 and viewed in the direction of the arrows;

Fig. 9 is a fragmentary section on an enlarged scale taken along line 9—9 of Fig. 3 and also viewed in the direction of the arrows;

Fig. 10 is a diagrammatic showing of an electrical circuit for supplying power to operate the gyroscope and also simultaneously to operate the erector mechanism;

Fig. 11 is an enlarged plan view similar to that of Fig. 3, also in gyro-vertical position showing a modified form of swing inhibiting or clamping mechanism for the erector weights;

Fig. 12 is a fragmentary enlarged view illustrating modified structural details that may be substituted for details shown in Fig. 5 as will hereinafter be described;

Fig. 13 is a fragmentary section on an enlarged scale similar to that of Fig. 9 illustrating modified structural details that may be substituted for those of Fig. 9; and Fig. 14 is a diagrammatic showing of an electrical circuit for supplying power to operate the gyroscope and the erector mechanism when the modification of Fig. 12 is employed.

Figure 1:
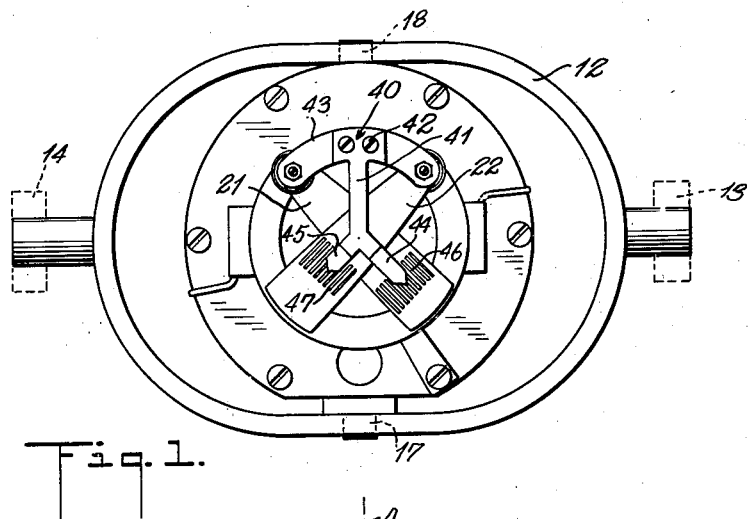
Fig. 1 is a top plan view of a gyroscope equipped with an erector mechanism embodying the invention, shown removed from its casing.

Referring to the drawings, 10 denotes in its entirety a gyro-vertical construction. This gyro-vertical 10 comprises an electrically driven gyroscope 11 supported for freedom of movement about mutually perpendicular horizontal axes and in substantial neutral equilibrium through the expedient of a gimbal construction 12 supported in axially aligned bearings 13, 14 for oscillatory or rotary movement about a horizontal, longitudinal major axis. The rotor bearing casing 15, [within which the gyro-rotor (not shown) is journalled so that its axis of rotation A—A is normally vertical] is supported in the gimbal ring 12 for oscillation about a horizontal axis which is perpendicular to that of the bearings 13, 14 as by axially aligned bearings 17, 18. The rotor bearing casing 15 includes a stator of the required type and, of course, the necessary commutator on the rotor shaft, and brushes all not shown if the gyro is a direct current type, or other necessary electrical connections if an alternating current driven gyro is used.

The erector mechanism constituting the invention, denoted generally by the reference character 20, is supported preferably from the rotor casing 15. This erector mechanism 20 in general comprises one or more unbalanced weights or arms each pivoted to rotate about an axis extending substantially parallel with the axis A—A of the gyro-rotor 15. In the embodiment shown, two such weights 21, 22 are shown. The weights 21, 22 are secured eccentrically to pintles 23, 24 for example by force fits. These pintles 23, 24 in turn are positioned to extend substantially parallel with the axis A—A of the gyro-rotor and are pivotally supported at their opposite ends, for example, in ball bearings 26 and 27 (Fig. 9). The weights 21, 22, therefore, swing in planes substantially perpendicular to the rotor axis A—A.

Biasing or centralizing springs 29, 30 resembling in form the hair springs of a watch balance wheel are provided for the respective pintles 23 and 24. The biasing spring 30 of the pintle 24 is shown in detail in Fig. 9. As seen therein, the inner end of the spring 30 is secured at 31 to a collet 32. The collet 32 is maintained on the pintle 24 as by a force fit. The outer end of the spring 30 is adjustably attached to a fixed support 34, for example, being threaded through an eye 35 of the support 34 and being maintained in any adjusted position with respect to the eye 35 by a removable wedge 36. The spring 29 of the pintle 23 is similarly arranged. These biasing springs function for purposes to be described.

In addition to the spring biasing arrangements described, a damping or rotational speed limiting arrangement D is provided for each pintle. In Fig. 9 this damping arrangement comprises the plate or disc-like member 32a secured to the pintle 24. This plate or disc-like member is in proximate contact with a second disc-like member 32b carried fixedly, for example, from the bearing 26. The separation (shown on an exaggerated scale) between the two members 32a, 32b is of the order of .005" to .025", and at any rate to provide sufficient spacing for a viscous material V, such as, heavy oil or other suitable viscous materials having a viscosity number of the order of approximately 200,000 centistokes. At least one such other suitable material is one selected from organo-silicon oxide polymers made by combining silicon dioxide with methyl or ethyl groups of molecules derived from alcohols or with ethylene chloride or phenol. Both straight chain or ring type organic molecules may be used with silicon dioxide resulting in products of various properties. Such materials all are characterized by their temperature stability, inertness, waterproofness and excellent dielectric properties. The selected of these materials particularly suitable has a viscosity number of the order of 200,000 centistokes and is a product of Dow Corning Corporation of Midland, Michigan, and is characterized by them as Silicone D. H. 200. It is to be understood, however, that other viscous materials having similar properties can be employed. The arrangement D is commonly known as a viscous damping arrangement.

The two pintles 23 and 24 are positioned at spaced apart points relative to the circumference of the rotor casing 15 and, preferably, the spacing is such that the center longitudinal axes of the arms or weights 21, 22 when in normal position cross each other substantially at right angles. This, of course, necessitates the support of the respective arms 21, 22 at different levels on their respective pintles 23 and 24. These arms have the respective slots 37, 38 which, in the embodiment shown, are of substantially oval shape with their major axes transverse to the respective longitudinal axes of the arms. The slots 37, 38 are positioned on the arms in substantially aligned relationship and in alignment with a projection of the axis A—A of the gyro-rotor 15 for purposes presently to be described.

Clamping means are provided normally to prevent free swing of the arms or weights 21, 22 and adapted periodically to be released to allow the weights to swing toward the downward side of the gyro whenever its rotor axis is out of the vertical or deviates from its erect position. In conjunction with this means, additional means are provided to reactuate the clamping means so as to relock the arms in the position to which they have been swung on the downward side of the gyro and thereafter while in such relocked position to be rotated about an axis preferably coextensive or concentric with a projection of the rotor axis A—A to a position wherein they will effect precessional movement of the gyroscope rotor axis and restore it to substantially vertical or initial erect position.

The swing inhibiting or clamping means which is designated generally by the reference character 40, in the embodiment shown, includes a spring-like member 41. This spring-like member 41 is supported at 42 from a frame part 43 that extends between the pintles 23, 24. This frame part 43 in effect, also constitutes the support for the pintle bearings 27. The spring-like member 41 extends from the frame part 43 in a radial direction toward the projection of the gyro-rotor axis and is substantially bifurcate at its free end providing two arm-like parts 44, 45. These arm-like parts or prongs have pointed ends, and these ends in turn are engageable respectively in any groove of a group of parallelly arranged grooves 46, 47 that are provided in the surfaces of the respective weights or arms 21 and 22. The spring-like part 41 is biased normally in a downward direction to cause the engagement of the pointed ends of the arms 44, 45 in the grooves 46, 47. Thus, until the spring-like part 41 is lifted, the arms 21, 22 are fixed against rotation.

Figure 2:
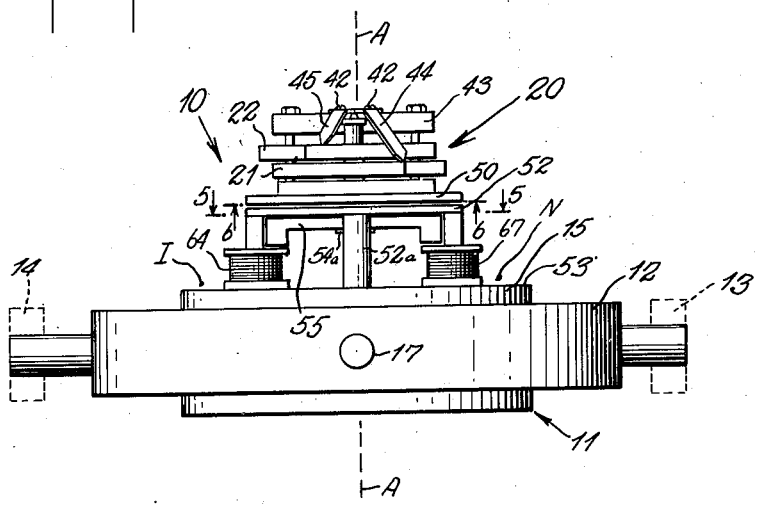
Fig. 2 is a side elevation thereof.

The stationary parts of the bearings 26 of the pintles 23, 24 are carried in a common support 50. This support in turn is borne rotatably on a sleeve part 51. This sleeve part 51 is, in the embodiment shown, preferably integral with a frame part 52. Preferably the sleeve part 51 and frame part 52 are of non-magnetic material, such as, aluminum alloy or the like. The frame part 52 is secured by leg members 52a (only one of which is shown) to the top 53 of the rotor casing 15 (see Fig. 2). A hollow shaft or sleeve 54, headed at 54a to receive and support an armature 55 of armature iron or other temporarily magnetizable material for purposes presently to be described is provided. This sleeve 54 extends through the sleeve part 51 and in assembled relationship is secured rotatably in place as by an assembly nut 54b. The frame part 52 is arranged to maintain the sleeve part 51 and hollow shaft or sleeve 54 substantially vertical, and with its axis preferably in alignment with the axis of the gyro-rotor. The sleeve part 51 and hollow shaft or sleeve 54 extend upwardly through the slots 37 and 38 of the arms 21, 22 and being of smaller dimensions than those of the slots function to permit limited swing of the pintle-supported arms 21, 22 to the extreme difference in dimensions between the respective slots 37, 38 and the external diameter of the sleeve part 51. Preferably the sleeve 54 is of steel although it may be of other desirable materials.

A push rod 58 is mounted slidably within the sleeve 54. The upper end of this push rod is engageable with the spring-like member 41 and functions when moved upwardly to flex the spring-like member 41 to effect unlocking of the pintle-supported weights or arms 21, 22 for limited rotation as will be described. On the other hand, when the rod 58 is permitted to move downwardly out of engagement with the spring-like member 41, the latter resumes its initial position locking the pintle-supported arms 21, 22 against rotation in the position they happen to be in at the moment of reengagement of the prongs 44, 45 in the respective grooves 46, 47 underlying the prong points.

The movement of the push rod 58 is controlled conveniently by a lever 60. This lever 60 is supported pivotally at 61 from a projection 61a upstanding from the top 53 of the rotor casing 15. The lever 60 extends substantially diametrically of the casing 15 and its central portion underlies the lower terminal of the push rod 58. The free end 61b of the lever 60 is somewhat enlarged. The lever 60 is in effect a permanent magnet being of permanently magnetic steel or other suitable material. Its enlarged end 61b constitutes one unchanging magnetic pole.

A member 62 of soft iron or other temporarily magnetizable material, such as, armature iron is secured to the rotor top 53 to underlie the portion 61b of the permanent magnet 60. This member 62 is in the magnetic circuit of a pole piece 63 whose polarity may be changed by reversal of direction of current in a coil or winding 64 surrounding a part of the pole piece or core 63. When the coil 64 is energized by a flow of electric current in a direction to render the polarity of the extension 62 opposite to that of the polarity of the part 61 of the permanent magnet 60, the latter at such time is attracted to and maintained in contact with the part 62. This, in the embodiment shown, is the normal condition. The lever 60 then is in such position that the push rod 58 is lowered sufficiently so that the prongs 44, 45 engage in grooves 46, 47 so that the pintle-supported arms 21, 22 are clamped against swing. When current through the coil 64 is reversed, the polarity of the part 62 is likewise reversed becoming like that of the part 61b of the lever 60 with consequent repulsion of like poles in a known manner. This repulsion rotates the lever 60 upwardly against the opposition of spring-like member 41 and moves the push rod or pin 58 upwardly and thereby effects release of the pintle-supported weights or arms 21, 22. When such release occurs, and the rotor axis is out of the vertical, the eccentrically supported weights 21, 22 swing toward the downward side of the gyro. The balance wheel biasing action effected by the springs 29, 30 at this time functions to retard and thus to prevent violent swing of the arms 21, 22 particularly when the deviation from the vertical of the rotor axis is not large. This biasing or retarding action is useful particularly for the purposes of preventing violent deflections from occurring in the erecting action when only slight deviation from normal has occurred. In such circumstances the biasing action prevents as wide a swing of the arms 21, 22 in their released period as would occur if no biasing spring were employed.

During the release period of the weights 21, 22, it is likely or possible that the vehicle, plane or other moving body in which the gyro is mounted will be subject to transient accelerations. The function of the viscous damping arrangement D is to inhibit or to minimize the effects of such transient accelerations on the positions of the weights at such time. Thus, the erecting action will be substantially independent of transient accelerations.

When the arms 21, 22 have swung toward the downward side of the gyro, erection will not occur until they have been clamped and shifted through a rotary angle of substantially 90° relative to their swung positions. This rotation is provided for in the embodiment so far described by automatic means controlled, as will be described, from the same means that functions to energize the coil 64.

To this end, a second pole piece 66 of material like pole piece or core 63 is positioned on the rotor casing cover 53 diametrically opposite to the pole piece 63. The winding or coil 67 of this pole piece 66 is connected in the electric circuit supplying current to the pole piece coil 64 so that the polarity of the pole piece 66 when current flows through its coil 67 is opposite to that of the pole piece 63.

The armature 55 which is carried on the sleeve 51 is positioned to lie within the magnetic field produced by the pole pieces 66 and 63. A biasing spring 70 secured both to the armature 55 and to a fixed point, for example, a portion of the lever 60, functions normally to maintain the armature 55 out of alignment with the pole pieces 66 and 63. When the pole pieces 63, 66 are energized the armature 55 swings against the action of the biasing spring 70 into alignment with the pole pieces and immediately after deenergization returns to its misaligned position which is substantially that shown in Fig. 5.

Figure 6:
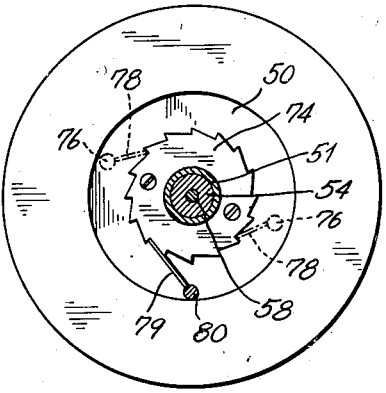
Fig. 6 is an enlarged sectional view taken along line 6—6 of Fig. 2 and viewed in the direction of the arrows.
Figure 7:
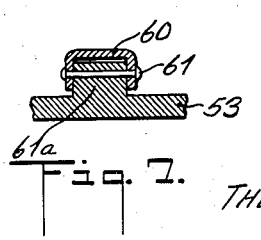
Fig. 7 is a sectional view taken along line 7—7 of Fig. 5 and viewed in the direction of the arrows.

A ratchet wheel 74 is secured to the pintle bearing support 50 and concentrically about the sleeve 51. One or more pawl supports 76 (Fig. 8) extend upwardly therefrom through arcuate slots 77 in the frame part 52. Pawls 78, one carried by each of the supports 76 are engageable with the teeth of the ratchet 74. In addition, a one-way pawl 79 is secured to a fixed pawl support 80 (Fig. 6). This pawl support 80 is secured appropriately to a fixed frame part, as for example, the frame part 52. The pawl 79 permits one-way rotation only of the ratchet 74. In consequence, alternate energization and deenergization of the solenoid coils 64 and 67 cause the pawls 78 to impart a step by step rotation of the ratchet wheel 74 in one direction only and with it the common pintle bearing support 50. As a result the entire mechanism bearing the releasable weights or arms 21, 22 is rotated as a unit with a center of rotation concentric with the axis of rotation A—A of the gyroscope rotor 15. This center of rotation need not be concentric, but a concentric arrangement is most convenient.

If the gyroscope and the erector mechanism are, for example, both operated by direct current of the same voltage, the winding or coils 64 and 67 of the erector mechanism are connected to the input terminals I, N, of the gyro in known way so that the polarity of the two pole pieces 64, 66 will always be opposite. Then the same direct current that operates the gyroscope motor will function to energize the coils 64 and 67 in required manner.

As has been described, the release of the pintle-supported weights or arms 21, 22 requires a reversal of polarity of the pole part 62. Also the step by step rotation of the ratchet 74 requires intermittent energization and deenergization of the solenoids 63, 67. There are a variety of ways of meeting these conditions. One proposal which is illustrated diagrammatically in Fig. 10 embodies the use of a small electric motor, which is provided on its drive shaft with a pair of insulated rings 100 and 101. The shaft of the small motor is illustrated diagrammatically at 102 and is adapted normally to make from 1 to approximately 4 revolutions per minute. Other speeds of course may be selected as desired.

The ring 100 is provided with a single declivity 103 in its peripheral surface into which periodically the switch operating member 104 of a movable switch contact 105 may enter. The movable switch contact 105 cooperates with a fixed switch contact 106. These contacts are connected in an electric circuit including a power source P and the solenoid coil 107 of an electrically operated double pole double throw reversing relay 108. While the switch operating member 104 rides on the surface of the ring 100 the switch contacts 105, 106 are maintained apart or in open circuit. In consequence, the solenoid coil 107 is not energized. Once during each revolution of the ring 100, the switch operating member 104 enters the declivity 103 and permits the temporary closure of the electrical circuit to solenoid coil 107 through the contacts 105, 106. In consequence the reversing relay 108 is actuated to reverse current flow from the same power source to the gyro-motor and to the coils 64, 67 of the erector mechanism.

The second ring 101 is provided in its periphery with a toothed sector 110. The number of teeth 110a in the sector is optional but preferably should correspond to the number of steps in the corresponding sector of the ratchet 74. If for example the sector 110 is the quadrant of a circle, and there are five tooth steps in a quadrant of the ratchet, there should be five teeth in the quadrant of the sector 110. However, the number of teeth need not necessarily correspond as the device will be operative without such correspondence. A switch operating member 111 is in contact normally with the surface of the ring 101 and when in such contact the movable contact element 112 carried thereby is in closed circuit with a fixed contact 113. While the operating member 111 is in contact with the toothed sector 110 rapid opening and closing of the circuit through the switch contacts 112, 113 is effected by the teeth 110a. In operation, when power supplied is from the source P, during those periods of a revolution of the motor shaft 102 when the solenoid 107 of the reversing relay 108 remains deactivated, the electric current flows through one set of contacts 1, 2 of the reversing relay and the contacts 112, 113 both to the input terminals I, N of the gyro-motor and to the coils for the erector system in a specific direction. During such current flow the toothed sector 110 for a period of the revolution of ring 101 effects alternate make and break of the contacts 112 and 113 sufficiently to produce a substantially 90° step by step rotation of the ratchet wheel 74 for each revolution of shaft 102 if the teeth 110a correspond in number to the number of steps in the ratchet 74. This alternate make and break has no material effect upon the speed of the rotating gyro-rotor. For the short period of time that the switch operating member 104 lies in the declivity 103 of the wheel 100, the solenoid 107 is energized, operating the reversing switch or relay 108 so as to reverse the direction of current flow from the power source P to the gyro-motor and to the coils 67 and 64 of the erector mechanism. The current flow is then through terminals 3, 4 of the relay 108. This reversal in flow has no effect on the direction of rotation of the gyro-rotor nor would it interfere with the step by step rotation of the ratchet 74. However, the reversal of current flow momentarily reverses the polarity of the pole 62 and effectuates the release of the pintle-supported weights or arms 21, 22 as previously described permitting them to swing toward the downward side of the gyro should the latter be out of vertical. As soon as the initial current flow conditions are reestablished the arms 21, 22 are reclamped. Then it is possible to make a reading. Thereafter while initial current flow conditions are maintained the step by step rotation of the ratchet 74 occurs to rotate the swung clamped arms 90° from the position they assumed during release. When this step by step rotation has been completed erection of the gyro occurs. The cycle is now ready for repetition.

Figure 3:
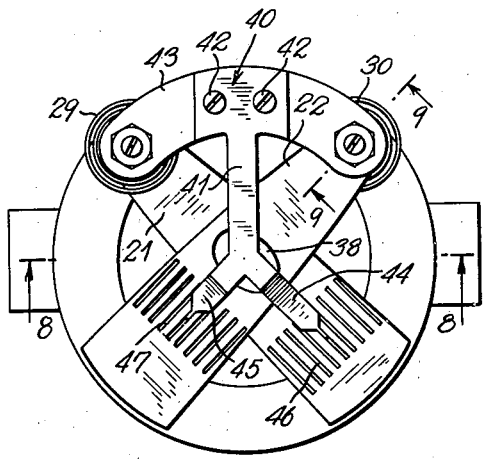
Fig. 3 is an enlarged plan view of the erector mechanism in the gyro-vertical position of its operation.
Figure 4:
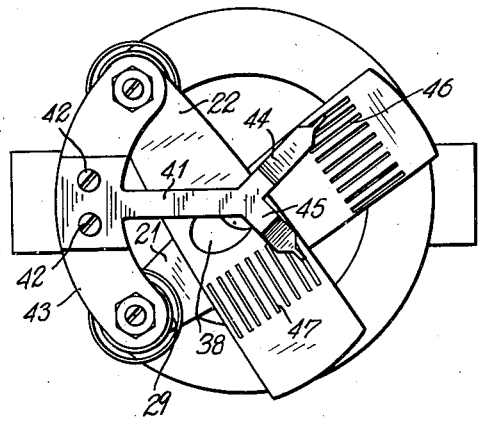
Fig. 4 is a similar plan view of the erector mechanism in another position of its operation.

It is to be understood that the particular lock or clamp and release mechanism for the weight arms 21, 22 may be modified. For example, as shown in Fig. 11, the bifurcate spring-like member 41 of Fig. 3 is replaced by a pair of independent spring-like members 120, 121. These spring-like fingers are supported independently at 122, 123 from a frame part 124 similar to frame part 43. The spring-like members 120, 121 extend radially toward the projection of the gyro-rotor axis and beyond the latter, crossing each other preferably at the said projection with one overlying the other. In Fig. 11, the member 120 overlaps member 121. The members 120, 121 beyond their crossover have respectively the pointed ends 126, 127. This crossover in Fig. 11 overlies the pin 58. These ends 126, 127 are engageable respectively in any groove of the group of grooves 46, 47 provided as described in the weight arms 21, 22.

The two spring-like members 120, 121 are operable by the same pin 58 which functions to operate the single spring-like member 41. It is to be understood that all parts in Fig. 11 bearing reference characters used in earlier figures are identical therewith.

While all figures show the erector mechanism rotatable as a unit about an axis concentric with that of the rotor axis, this is a preferable expedient but not absolutely essential for successful operation.

In some instances the biasing or centralizing springs 29, 30 may be eliminated entirely. However, it is preferable to retain them. The damping for the pintles 23, 24 heretofore described can also be modified. For example, in Fig. 13, the pintle 24m which corresponds with pintle 24 is shown slanted slightly out of the vertical. Even with this slight slant the pintle axis can be regarded as substantially parallel with the rotor axis or as extending in the same general direction therewith. This slanting arrangement can be applied equally to any or all pintles used in the device. This slanting produces primarily a centralizing action and in addition possibly has some damping effect. In addition, the specific viscous damping arrangement D heretofore described can be of modified form. In Fig. 13 a viscous damping arrangement Dn is shown. This damping or speed limiting arrangement includes a collar or ring 130 that surrounds the pintle 24m. A bracket 131 secured to a fixed frame part as the frame part 50 serves to secure the ring 130 fixedly. There is sufficient clearance (shown on an exaggerated scale in Fig. 13) between the pintle 24m and internal wall of ring 130 for viscous material Vm identical with the viscous material V heretofore described. The clearance is of the same order as that between the discs 32a, 32b of the damping arrangement D heretofore described.

Figure 5:
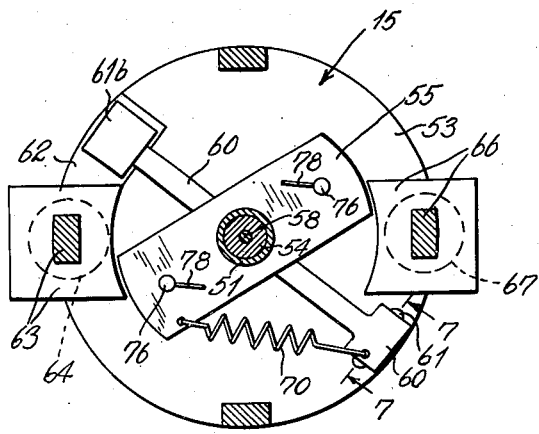
Fig. 5 is an enlarged sectional view taken along line 5—5 of Fig. 2 and viewed in the direction of the arrows.

It is to be understood that the armature 55 of Fig. 5 may be replaced by other magnetic materials. For example, there are available on the market at the present time, improved permanent magnets that may be used in disc form and which have opposite poles at diametrically opposite points. In Fig. 12 the armature 155 of such permanent magnetic material is provided. This armature 155 is mounted in the same way as the armature 55. A biasing spring 170 functions to normally rotate this armature in counterclockwise direction as seen in Fig. 12. One or more pawls 178 secured to the corresponding number of pawl supports 176 carried by the armature 155 function with the ratchet 174 which is similar to ratchet 74 except that it has only four teeth spaced at 90° intervals. The fixed pawl 179 functions in the same way as pawl 79.

A pin 180 or other stop mechanism operates between a pair of fixed stops 181, 182. These stops are approximately 95° apart and are positioned so that when current flows through the coils which energize the pole pieces 63, 66 so that as shown in Fig. 12 pole piece 66 is south and pole piece 63 is north pin 180 abuts pin 181. When the polarity of pole pieces 66 and 63 is reversed the repelling action of like adjacent poles in the armature 155 and respective pole pieces 63, 66 causes armature 155 to rotate counterclockwise in Fig. 12 to the limit permitted by stop 182 which is approximately a 95° rotation and in opposition to biasing spring 170. The pawls 178 then engage behind the next tooth of ratchet 174. As soon as the polarity of poles 66, 63 reverses again to initial condition shown in Fig. 12, the armature 155 returns to its initial condition, thus advancing the gyro erector mechanism 90°. The cycle is now complete and ready for repetition. All parts in Fig. 12 having the same reference characters as in earlier figures are unchanged.

In order to effect the polarity reversal in pole pieces 63, 66, the electric circuit of Fig. 10 must be slightly modified as shown in Fig. 14. All parts therein having the same reference numerals as those in Fig. 10 with the subscript a are identical therewith and function in the same way except as hereinafter stated. The second ring 101a of the small motor 102a is modified by having a single tooth 110a instead of five such teeth as shown in Fig. 10.

The contact 1a is not connected to the contact 4a, although the contacts 1 and 4 of Fig. 10 are. The contact 113a is connected, however, to the contact 4a. Otherwise the circuit is unchanged. Switch contacts 113a, 112a are normally closed. Switch contacts 105a, 106a are normally open.

The reversing relay 108a when solenoid 107a is deactivated permits current flow from the power source Pa through contacts 1a, 2a and switch contacts 113a, 112a to the gyro input terminals Ia, Na and to the coils of the pole pieces 63, 66 producing the polarity shown in Fig. 12 in these pole pieces. At the moment contacts 113a, 112a are separated by action of the tooth 110a, the contacts 105a, 106a close operating the reversing relay 108a to reverse current flow to the gyro and coils through contacts 3a, 4a instead of 1a, 2a, thus reversing polarity of poles 63, 66 so that the armature 155 rotates counterclockwise in Fig. 12 as previously described. As soon as the contacts 113a, 112a and 105a, 106a are restored to the initial conditions shown in Fig. 14, the conditions shown in Fig. 12 are restored.

It is seen, therefore, that with the arrangements described it is possible to provide erector systems and controls therefor, operable by using only the lead-in connections which are necessary to drive the gyro-motor. As a result great simplification in the entire mechanical construction of an erector mechanism has been provided. However, the diagrammatically outlined arrangement for providing the necessary power supply for actuating the erector mechanism is only exemplary. Entirely different types of switching arrangements could be employed to provide a needed current reversals and make and break effects. Likewise, if the gyro is an alternating current type, the input terminals of the gyro are separately supplied with alternating current, and the coils of the erector mechanism which is direct current driven are not connected to the input terminals of the gyro.

It is to be understood, of course, that the extent of the release period during which the weight arms 21, 22 are free to swing also will determine how far they will swing on their pintle axes, and consequently, how much erection force the weight arms will provide for any given test. Moreover, by changing the time of release, the motion of the arms may be controlled as desired, and therefore, the speed of the erecting action may be changed at will by the operator.

While the electrical coils 64, 67 are indicated in Figs. 10 and 14 as being connected in parallel with the input terminals to the gyro-motor, these coils could be in series connection with either of the motor field or rotor connections.

While specific embodiments of the invention have been disclosed it is to be understood that variations in structural detail are possible and are contemplated within the scope of the claims. There is no intention, therefore, of limitation to the exact details shown and described.

What is claimed is:

1. In a device of the character described, means for erecting a gyroscope comprising a weight arm, means for pivotally supporting said arm for swing about an axis substantially parallel with the axis of the gyroscope rotor, means for clamping said arm against swing, means for temporarily releasing said clamping means, means for limiting the speed of said swing, means for rotating said weight arm about another axis also substantially parallel with that of said rotor to an erecting position while the arm is clamped against swing, and means for periodically cycling the actions of said clamping means, said releasing means and said rotating means.

2. In a device of the character described, means for erecting a gyroscope comprising a weight arm, means for pivotally supporting said arm for swing about an axis substantially parallel with the axis of the gyroscope rotor, means for clamping said arm against swing, means for temporarily releasing said clamping means, means for limiting the speed of said swing, means for limiting the extent of said swing, means for rotating said weight arm about another axis also substantially parallel with that of said rotor to an erecting position while the arm is clamped against swing, and means for cyclically operating both said releasing means and said rotating means.

3. In a device of the character described, means for erecting the rotor axis of a gyroscope to a vertical position comprising a weight, means for pivotally supporting said weight eccentrically for swing about an axis parallel with the rotor axis, means for clamping said weight against swing, means for releasing said clamping means as required to permit the weight to swing to the down side of the gyroscope when its rotor axis deviates from the erect position, and means for rotating said weight after it has been clamped in its swung position about another axis also substantially parallel with that of said rotor axis and into an erecting position to then effect a precessional movement of the rotor axis toward the vertical position.

4. In a device of the character described, means for erecting the rotor axis of an electrically driven gyroscope to a vertical position comprising a weight, means for pivotally supporting said weight eccentrically for swing about an axis parallel with the rotor axis, means for clamping said weight against swing, electrically operated means for releasing said clamping means as required to permit the weight to swing to the down side of the gyroscope when its rotor axis deviates from the erect position, and electrically operated means for rotating said weight after it has been clamped in its swung position about another axis also substantially parallel with that of said rotor axis and into an erecting position to then effect a precessional movement of the rotor axis toward the vertical position.

5. A device as per claim 4 in which said electrically operated releasing means, and said electrically operated rotating means are connected to input terminals of said gyroscope to receive electric current from the same source of electric current that serves to drive the gyroscope.

6. A device as per claim 4 including means for supplying electric current cyclically to said electrically operated releasing means and said electrically operated rotating means.

7. In a device of the character described, means for erecting the rotor axis of a gyroscope to a vertical position comprising weights, means for pivotally supporting said weights eccentrically for swing independently about spaced apart axes each parallel with the rotor axis, means for clamping said weights against swing, means for releasing said clamping means as required to permit the weights to swing on their respective axes toward the down side of the gyroscope when its rotor axis deviates from the erect position, means for rotating the weights as a unit after they have been clamped into their swung positions about another axis also substantially parallel with that of said rotor axis and into an erecting position to then effect a precessional movement of the rotor axis towards the vertical position, and means for periodically cycling the operations of said releasing means and of said rotating means.

8. In a device of the character described, means for erecting the rotor axis of an electrically driven gyroscope to a vertical position comprising weights, means for pivotally supporting said weights eccentrically for swing independently about spaced apart axes each parallel with the rotor axis, means for clamping said weights against swing, electrically operable means for releasing said clamping means cyclically as required to permit said weights to swing on their respective axes toward the down side of the gyroscope when its rotor axis deviates from the erect position, means to reduce the speed of said swing, and electrically operable means for cyclically rotating the weights as a unit after they have been clamped into their swung positions about another axis also substantially parallel with that of said rotor axis and into erecting positions to then effect precessional movements of the rotor axis towards its vertical position.

9. In a device of the character described, means for erecting the rotor axis of an electrically driven gyroscope to a vertical position comprising weights, pintle supports for the weights extending substantially parallel with the rotor axis, spring actuated means for normally clamping said weights against swing, electromagnetically actuated means for releasing said clamping means as required to permit said weights to swing toward the down side of the gyroscope when its rotor axis deviates from the erect position, and electromagnetically actuated ratchet means for rotating the weights as a unit after they have been clamped into their swung positions about an axis substantially parallel with that of said rotor axis and into an erecting position to then effect precessional movement of the rotor axis towards its vertical position.

10. A device as per claim 9, wherein said electrically driven gyroscope, said electromagnetically actuated releasing means, and said electromagnetically actuated ratchet means, are connected to a common source of electric power.

11. In a device of the character described, means for erecting the rotor axis of a gyroscope to a vertical position comprising pivotally supported weight arms swingable in planes substantially perpendicular to the rotor axis, damping means for retarding the swinging action of the arms, clamping means engageable with the arms for normally preventing any swing thereof, a member for releasing said clamping means to permit the arms to swing toward the down side of the gyroscope when its rotor axis deviates from the erect position, electromagnetic means for operating said member, a common support for both said arms and means for rotating said support about an axis concentric with that of said rotor in step by step sequence at predetermined times to move the swung weight arms to erecting positions to then effect precessional movements of the rotor axis towards the vertical position.

12. In a device as per claim 11, a centralizing arrangement in conjunction with said pivotally supported weight arms.

13. In conjunction with a gyroscope having a rotor, gyroscope erecting mechanism comprising a weight arm, a pivotal support for said arm arranged so that the latter may swing about an axis extending in the same general direction as the axis of the rotor, a clamping device to prevent swing of said arm except at determined times, a centralizing device for said arm, a damping device for said arm, and means for rotating said arm about another axis substantially concentric with that of said rotor to an erecting position while the arm is clamped against swing.

14. In conjunction with a gyroscope having a rotor, erecting mechanism comprising weight arms, pivotal supports for said arms arranged so that the arms will swing about axes extending in the same general direction as the axis of the rotor, clamping devices to prevent swing of said arms except at determined times, centralizing devices for said arms, damping devices for said arms, and means for rotating said arms as a unit about another axis substantially concentric with that of said rotor to an erecting position while the arms are clamped against swing.

THEODORE W. KENYON.

REFERENCES CITED

The following references are of record in the file of this patent:

UNITED STATES PATENTS

| Number | Name | Date |
|---|---|---|
| 1,485,783 | Gardner | Mar. 4, 1924 |
| 1,524,709 | Gray | Feb. 3, 1925 |
| 1,627,178 | Henry | May 3, 1927 |
| 2,368,058 | Whatley | Jan. 23, 1945 |